(12) United States Patent
Kawazu et al.

(10) Patent No.: US 9,981,638 B2
(45) Date of Patent: May 29, 2018

(54) VEHICLE PEDAL DEVICE

(71) Applicant: TOYOTA JIDOSHA KABUSHIKI KAISHA, Toyota-shi, Aichi (JP)

(72) Inventors: Toshihiro Kawazu, Okazaki (JP); Naruki Yamamoto, Toyota (JP); Takaomi Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 15/185,906

(22) Filed: Jun. 17, 2016

(65) Prior Publication Data
US 2017/0050625 A1 Feb. 23, 2017

(30) Foreign Application Priority Data
Aug. 20, 2015 (JP) ................... 2015-162382

(51) Int. Cl.
*B60T 7/04* (2006.01)
*B60T 7/06* (2006.01)
*G05G 1/32* (2008.04)

(52) U.S. Cl.
CPC .............. *B60T 7/04* (2013.01); *B60T 7/065* (2013.01); *G05G 1/32* (2013.01)

(58) Field of Classification Search
CPC .............. G05G 1/32; B60T 7/04; B60T 7/065
See application file for complete search history.

(56) References Cited

U.S. PATENT DOCUMENTS

| 2002/0179359 A1* | 12/2002 | Kawai ............... B60R 21/09 180/274 |
| 2005/0050980 A1* | 3/2005 | Park ................. B60T 7/065 74/512 |
| 2005/0217264 A1* | 10/2005 | Miyoshi .............. B60R 21/09 60/554 |
| 2006/0070487 A1 | 4/2006 | Hayashi |
| 2007/0137398 A1 | 6/2007 | Tokumo et al. |

(Continued)

FOREIGN PATENT DOCUMENTS

| CN | 1754729 A | 4/2006 |
| CN | 1966300 A | 5/2007 |

(Continued)

OTHER PUBLICATIONS

EPO Machine Translation of JP 2010067138 (A), Masayuki et al., Mar. 25, 2010.*

*Primary Examiner* — Vinh Luong
(74) *Attorney, Agent, or Firm* — Oliff PLC

(57) ABSTRACT

The vehicle pedal device includes a pedal bracket fixed to a dash panel, a pedal, a lever bracket fixed to the dash panel, fixing means fixing the pedal bracket and the lever bracket with a predetermined holding force for fixed state, a rotating lever, a reinforcement for instrument panel, a lever rotator which is fixed to the reinforcement for instrument panel, and bracket deforming means fixed to the reinforcement for instrument panel. The bracket deforming means contacts with the pedal bracket to deform the pedal bracket downward when the pedal bracket moves rearward together with the dash panel. The rotating lever comprises a press portion which can press the fixing means or the pedal bracket downward with a force exceeding the holding force for fixed state when the rotating lever is rotated by the lever rotator.

6 Claims, 7 Drawing Sheets

(56) References Cited

U.S. PATENT DOCUMENTS

| | | | | |
|---|---|---|---|---|
| 2009/0200781 | A1* | 8/2009 | Hatakenaka | B60R 21/09 280/748 |
| 2011/0030500 | A1* | 2/2011 | Tokumo | B60R 21/09 74/512 |
| 2015/0329089 | A1* | 11/2015 | Kitaguchi | G05G 1/32 74/512 |
| 2016/0273630 | A1* | 9/2016 | Ogawa | B60T 7/065 |

FOREIGN PATENT DOCUMENTS

| | | |
|---|---|---|
| JP | 2008-15882 A | 1/2008 |
| JP | 2009-271694 A | 11/2009 |
| JP | 2010-67138 A * | 3/2010 |

* cited by examiner

VEHICLE PEDAL DEVICE

BACKGROUND OF THE INVENTION

1. Field of the Invention

The present invention relates to a vehicle pedal device.

2. Description of the Related Art

Japanese Patent Application Laid-open No. 2009-271694 discloses a vehicle brake pedal device.

This vehicle is provided with a dash panel which constitutes a portion of a body shell.

The brake pedal device is provided with a pedal bracket and a pedal.

The pedal bracket and the pedal are located behind the dash panel. The front end portion (lower portion) of the pedal bracket is fixed to the rear surface of the dash panel with a bolt and a nut.

The pedal is supported by the pedal bracket to be rotatable about an axis extending in the vehicle width direction (i.e., lateral direction). The pedal is biased so as to be rotated rearward by a biasing means.

Additionally, the brake pedal device has a stopper which restricts a rearward rotation of the pedal at a predetermined initial position by contacting with the pedal from behind. Therefore, when a driver put his/her foot off the brake pedal, the brake pedal is located at the initial position.

Furthermore, a brake booster is fixed to the front surface of the dash panel. The brake booster has a pushrod which is movable in the forward/rearward direction. The rear portion of the pushrod passes through a through hole formed through the dash panel and is connected to the pedal.

Therefore, when the driver depresses the brake pedal forward by his/her foot, the pushrod moves forward. As a result, the brake booster is actuated. Then, the depression force applied by the driver is transmitted to brake hydraulic oil in a master cylinder while being amplified by the brake booster. Therefore, brake devices, which correspond to each of wheels respectively and are connected to the master cylinder, are activated, so that a braking force is exerted on each of the wheels from each of the brake devices.

The vehicle disclosed in Japanese Patent Application Laid-open No. 2009-271694 has a reinforcement for instrument panel supporting an instrument panel. The reinforcement for instrument panel extends in the vehicle width direction. Both ends of the reinforcement for instrument panel are fixed to the body shell. Furthermore, the vehicle brake pedal device disclosed in Japanese Patent Application Laid-open No. 2009-271694 has a retreat prevention bracket (guide plate) fixed to the reinforcement for instrument panel.

The entire lower surface of the retreat prevention bracket is constituted by a curved surface which extends gradually downward from the front portion thereof to the rear portion thereof. The lower surface of the front end portion of the retreat prevention bracket is in contact with the upper surface of the rear end portion of the pedal bracket from above. Additionally, the retreat prevention bracket has a through hole penetrating the front end thereof in the vertical direction.

The pedal bracket has a long hole which penetrates the rear end portion thereof (upper portion thereof) in the vertical direction and extends in the forward/rearward direction. A weld nut is fixed (welded) to the lower surface of the rear end portion of the pedal bracket. The weld nut is provided with a main body and a pair of welding portions. The main body has a female screw hole whose axis extends in the vertical direction. The welding portions extend from left and right positions of the main body in the lateral direction respectively. The left and right welding portions of the weld nut are welded to the lower surface of the rear end of the pedal bracket, and the female screw hole of the weld nut is positioned directly below the long hole.

A bolt is inserted into the through hole of the retreat prevention bracket from above, and the bolt is screwed into the female screw hole of the weld nut fixed to the pedal bracket. The head portion provided at the upper end of the bolt is pressed against the upper surface of the retreat prevention bracket. In other words, the rear end portion of the pedal bracket and the front end portion of the retreat prevention bracket are sandwiched between the head portion of the bolt and the weld nut in the vertical direction.

In this way, the rear end portion (upper portion) of the pedal bracket is fixed to the retreat prevention bracket. In other words, the front end portion (lower portion) and the rear end portion (upper portion) of the pedal bracket are fixed to the dash panel and the retreat prevention bracket both of which are fixed members of the vehicle. Therefore, mounting strength of the pedal bracket with respect to the vehicle is a sufficient magnitude. Accordingly, when the driver depresses the brake pedal, a rotational movement of the brake pedal is stabilized.

For example, when the vehicle of Japanese Patent Application Laid-open No. 2009-271694 collides with another vehicle which is located in front of the vehicle, an impact is generated in the vehicle at the time of the collision, and thereby a large rearward force is applied to the entire vehicle. At this time, when a magnitude of a rearward force applied to the dash panel is larger than that of a rearward force applied to the reinforcement for instrument panel and the retreat prevention bracket, the dash panel deforms rearward with a larger amount than the retreat prevention bracket. As a result, the dash panel moves rearward together with the pedal bracket with respect to the retreat prevention bracket.

Then, when the magnitude of the rearward force applied to the dash panel and the pedal bracket exceeds a predetermined value, two portions of the weld nut which connect the main body with the welded portions are broken. Therefore, the bolt integrated with the retreat prevention bracket moves forward in the long hole of the pedal bracket. In other words, the pedal bracket moves rearward relative to the retreat prevention bracket.

Then, the rear portion of the pedal bracket comes into contact with the curved surface formed on the lower surface of the retreat prevention bracket. As a result, the pedal bracket is deformed obliquely downward by the curved surface, so that the brake pedal is moved obliquely forwardly downward. Therefore, it is possible to suppress a rearward movement of the brake pedal, in other words, a movement of the brake pedal toward the driver.

SUMMARY OF THE INVENTION

If most of component forces of a force applied to the dash panel at the time of the collision of the vehicle disclosed in Japanese Patent Application Laid-open No. 2009-271694 are rearward component forces, as described above, it is possible for the vehicle brake pedal device to move the brake pedal obliquely forwardly downward.

However, directions of components forces of the force generated in the vehicle by an actual collision are diverse. Namely, there is a sufficient possibility that the force includes a lot of lateral component forces. Therefore, there is a possibility that the dash panel and the reinforcement for instrument panel, which are independent members each other, deform in different directions from each other (respectively). For example, when one of the dash panel and the reinforcement for instrument panel deforms rearward and the other of the dash panel, and the reinforcement for instrument panel deforms rearward as well as in the lateral direction, the pedal bracket moves in the lateral direction relative to the retreat prevention bracket. Then, since the weld nut and the bolt are pried each other (i.e., a portion of the weld nut and a portion of the bolt are brought into contact with each other in the lateral direction with a large force), there is a high possibility that the two portions of the weld nut which connect the main body with the welded portions are not broken.

When the weld nut is not broken, the pedal bracket does not move rearward relative to the retreat prevention bracket. Therefore, in this case, there is a possibility that the brake pedal moves together with the dash panel and the pedal bracket rearward, in other words, toward the driver.

The present invention has been made to cope with the above problems. Namely, the present invention has an object to provide a vehicle pedal device in which mounting strength of a pedal bracket with respect to a vehicle is a sufficient magnitude, and a movement of a pedal toward a driver can be securely suppressed regardless of a direction of force generated in the vehicle due to a collision.

In order to achieve the object, a vehicle pedal device (20) of the present invention comprises:

a pedal bracket (21) fixed to a rear surface of a dash panel (11) which constitutes a portion of a body shell of a vehicle (10);

a pedal (26) which is supported by the pedal bracket to be rotatable about an axis (30) extending in a vehicle width direction at a rearward position with respect to a fixed portion (25) of the pedal bracket to the dash panel;

a lever bracket (32) fixed to the dash panel, the lever bracket being a member independent of the pedal bracket;

fixing means (40, 45) for fixing the pedal bracket and the lever bracket to each other with a predetermined holding force for fixed state, and for releasing a fixed state between the pedal bracket and the lever bracket when the pedal bracket receives a force, exceeding the holding force for fixed state, in a direction to cause the pedal bracket to move downward relative to the lever bracket;

a rotating lever (47) which is supported by the lever bracket to be rotatable about a rotation axis (53) extending in the vehicle width direction;

a reinforcement for instrument panel (12) which is fixed to the body shell and supports an instrument panel (13);

a lever rotator (55) which is fixed to the reinforcement for instrument panel, the lever rotator contacting with the rotating lever from behind to rotate the rotating lever when the lever bracket moves rearward together with the dash panel; and bracket deforming means (55), fixed to the reinforcement for instrument panel, for contacting with the pedal bracket from behind to deform the pedal bracket downward when the pedal bracket moves rearward together with the dash panel.

The rotating lever includes a press portion (51) capable of pressing the fixing means or the pedal bracket downward with a force exceeding the holding force for fixed state when the rotating lever is rotated by the lever rotator.

In the present invention, the pedal bracket is fixed to the dash panel by fixing both of the pedal bracket and the lever bracket that is fixed to the pedal bracket with a predetermined holding force for fixed state to the dash panel. Since the pedal bracket is fixed to the dash panel at two points, it is possible to make the mounting strength of the pedal bracket with respect to the dash panel a sufficient magnitude.

Directions of component forces of a force generated in the vehicle due to an actual collision are diverse. For example, when the force contains not only rearward component forces but also a lot of lateral component forces, the dash panel is deformed not only rearward but also in a lateral direction. However, even when the dash panel is deformed in any direction, the pedal bracket and the lever bracket (and the rotating lever), which are fixed to the dash panel, move substantially in the same direction. In other words, a moving direction of the pedal bracket and moving directions of the lever bracket and the rotating lever are not largely different from each other when the dash pane is deformed. Therefore, even when the dash panel is deformed in various directions due to the collision, an occurrence of prying in the fixed portion (the fixing means) between the pedal bracket and the lever bracket is suppressed. Therefore, even when the dash panel is deformed in any direction, it is possible to separate the pedal bracket from the lever bracket. In other words, regardless of the deformation direction of the dash panel, it is possible to move the pedal forward relative to the dash panel.

The rotating lever includes a linear contacting portion (50) having a linear shape parallel to the rotation axis. The linear contacting portion contacts with the lever rotator when the lever bracket moves rearward.

Further, the lever rotator includes a contacting plane surface (57) which provides a plane parallel to the rotation axis to contact with the linear contacting portion when the lever bracket moves rearward.

The linear contacting portion is parallel to the rotation axis of the rotating lever, and the contacting plane surface provides constituted by the plane parallel to the rotation axis. Therefore, when the linear contacting portion contacts with the contacting plane surface, the rotating lever receives a forward reaction force, in other words a reaction force which hardly includes a lateral direction component force, from the lever rotator.

Therefore, it is possible to securely release the fixed state between the pedal bracket and the lever bracket by the press portion of the rotating lever.

The fixing means may comprise a bolt (40) and a nut (45).

The bolt penetrates one of the pedal bracket and the lever bracket in the vehicle width direction. The bolt provides at one end thereof a head portion (42) contacting with one of two lateral surfaces of the other of the pedal bracket and the lever bracket.

The nut is screwed with the bolt. The nut and the head portion sandwich the other of the pedal bracket and the lever bracket with the holding force for fixed state by contacting with the other of the two lateral surfaces of the other of the pedal bracket and the lever bracket.

The fixing means can be constituted by a simple and inexpensive means (members).

Furthermore, it is possible to adjust a magnitude of the holding force for fixed state easily by adjusting a tightening force between the bolt and the nut.

A first bolt receiving groove (35) may be formed in the lever bracket. The bolt is insertable into the first bolt receiving groove from below. The first bolt receiving groove has an open lower end.

In this case, since the lower end of the first bolt receiving groove is opened, the bolt integrated with the pedal bracket can escape downward from the first bolt receiving groove. Therefore, it becomes easier to separate the pedal bracket from the lever bracket.

Alternatively, a second bolt receiving groove may be formed in the pedal bracket. The bolt is insertable into the second bolt receiving groove from above. The second bolt receiving groove has an open upper end.

In this case, since the upper end of the second bolt receiving groove is opened, the bolt integrated with the lever bracket can escape upward from the second bolt receiving groove. Therefore, it becomes easier to separate the pedal bracket from the lever bracket.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Figure 1:
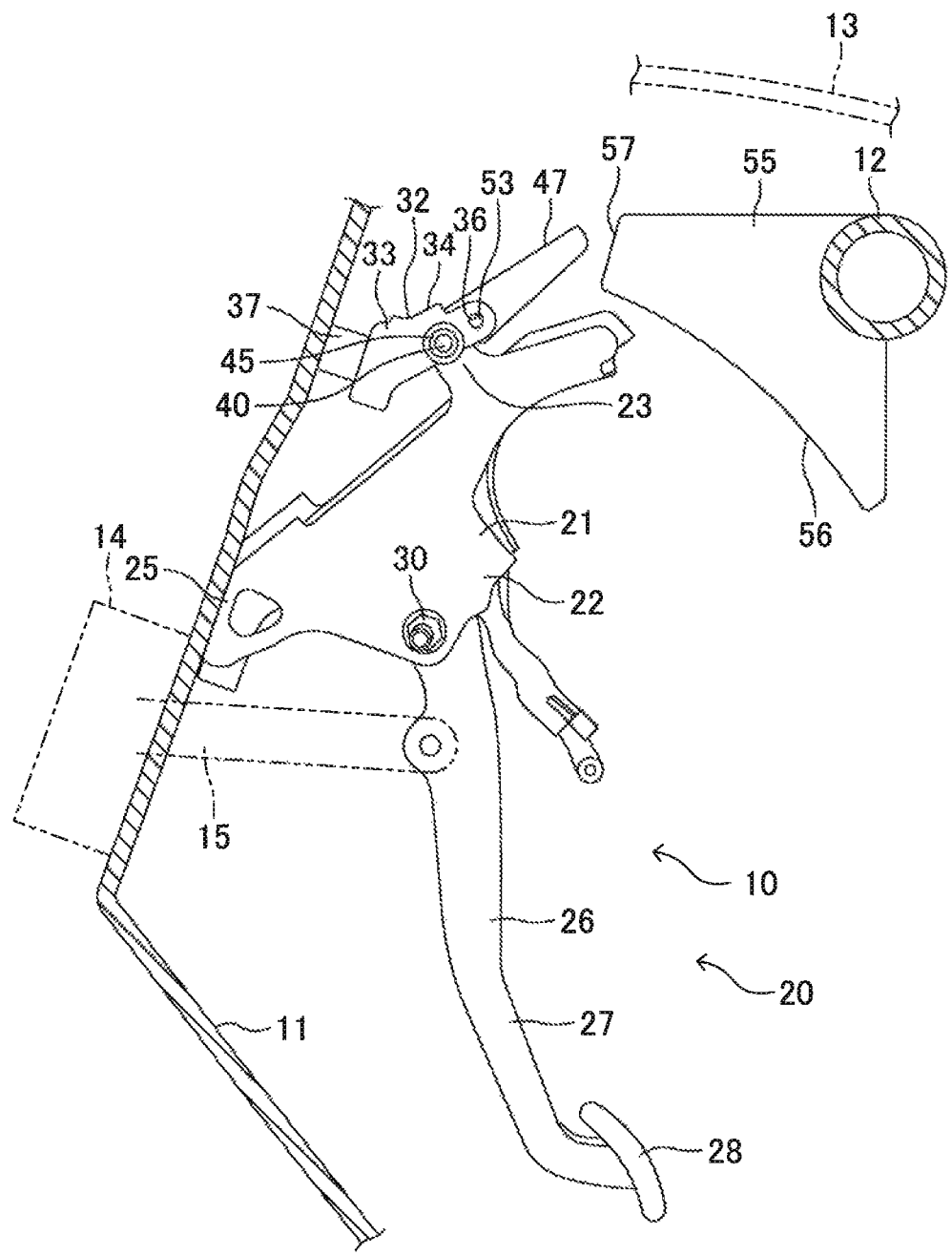
FIG. 1 is a side view of a vehicle pedal device according to an embodiment of the present invention.

A vehicle 10 provided with a vehicle pedal device according to an embodiment of the present invention will be described hereinafter with reference to the accompanying drawings.

A metal body shell constitutes a body of a vehicle 10, and a portion of the body shell is constituted by a dash panel 11 made of a metal plate. An engine room is formed in front of the dash panel 11 while a cabin is formed behind the dash panel 11.

The vehicle 10 is further comprises a reinforcement for instrument panel 12 which is a metal pipe extending in the vehicle width direction (ie., lateral direction). Both end portions of the reinforcement for instrument panel 12 are fixed to the body shell. Further, an instrument panel 13 (shown in FIG. 1) is fixed to the reinforcement for instrument panel 12.

A brake pedal device 20 of the present embodiment is mounted onto the dash panel 11 and the reinforcement for instrument panel 12.

The brake pedal device 20 is provided, as main components, with a pedal bracket 21, a brake pedal 26, a lever bracket 32, a bolt 40, a nut 45, a rotating lever 47, a rotation axis 53, and a retreat prevention bracket 55.

Figure 5:
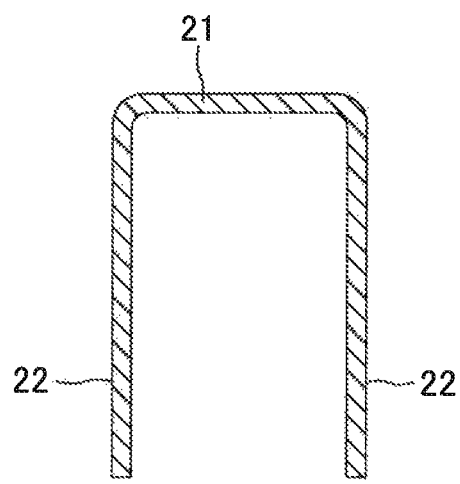
FIG. 5 is a cross sectional view of the vehicle pedal device taken along the line V-V of FIG. 3.

The metal pedal bracket 21 is positioned behind the dash panel 11, and has left and right pair of side plates 22. As shown in FIG. 5, the front half portion of the pedal bracket 21 has a cross sectional inverted U-shape whose lower surface is opened. The pedal bracket 21 is provided at the rear portion thereof with left and right pair of holding pieces 23 extending upward. Furthermore, each of the left and right holding pieces 23 has a through hole 24 (shown in FIG. 7). The left and right through holes 24 are coaxial with each other. A fixed portion 25 formed at the front end portion (lower portion) of the pedal bracket 21 is fixed to the rear surface of the dash panel 11 using a bolt and a nut (not shown).

The brake pedal 26 (pedal) is provided integrally with an elongated arm 27 and a pad 28 fixed to the lower end of the arm 27.

The upper portion of the arm 27 is located between the left and right side plates 22 of the pedal bracket 21. A support pin 30 (axis) extending in the vehicle width direction is disposed between the left and right side plates 22. Left and right ends of the support pin 30 are fixed to the left and right side plates 22, respectively. The upper portion of the arm 27 is rotatably supported by the support pin 30 in a space between the left and right side plates 22.

The brake pedal 26 is rotationally biased in the counterclockwise direction in FIGS. 1 through 4 by a biasing means (not shown). Additionally, the brake pedal device 20 has a stopper (not shown) for regulating the counterclockwise rotation of the brake pedal 26 at a predetermined initial position by contacting with the arm 27 from behind. Therefore, when the driver puts his/her foot off the pad 28 of the brake pedal 26, the brake pedal 26 is positioned at the initial position.

A brake booster 14 is fixed to the front surface of the dash panel 11 (shown in FIG. 1). The brake booster 14 has a pushrod 15 which can move in the forward/rearward direction (shown in FIG. 1). The rear portion of the pushrod 15 passes through a through hole (not shown) formed through the dash panel 11, and the rear end portion of the pushrod 15 is rotatably connected to the arm 27. The brake booster 14 is connected to a master cylinder (not shown), and the master cylinder is connected to each brake device which is provided so as to correspond to each of wheels (not shown).

When the driver depresses the pad 28 forward with his/her foot, the brake pedal 26 is rotated in the clockwise direction in FIGS. 1 through 4 about the support pin 30 against a biasing force of the biasing means. Then, the pushrod 15 is moved forward from the state shown in FIG. 1, and the brake booster is actuated. As a result, the depression force applied to the pad 28 by the driver is transmitted to brake hydraulic oil in the master cylinder while being amplified by the brake booster 14. Therefore, a braking force is exerted on each of the wheels from each of the brake devices.

When the driver puts his/her foot off the pad 28, the brake pedal 26 moves back to the initial position by the biasing force of the biasing means, and the braking force, which was exerted on each of the wheels from each of the brake devices, is disappeared.

The metal lever bracket 32 is positioned between the left and right holding pieces 23 of the pedal bracket 21.

Figure 4:
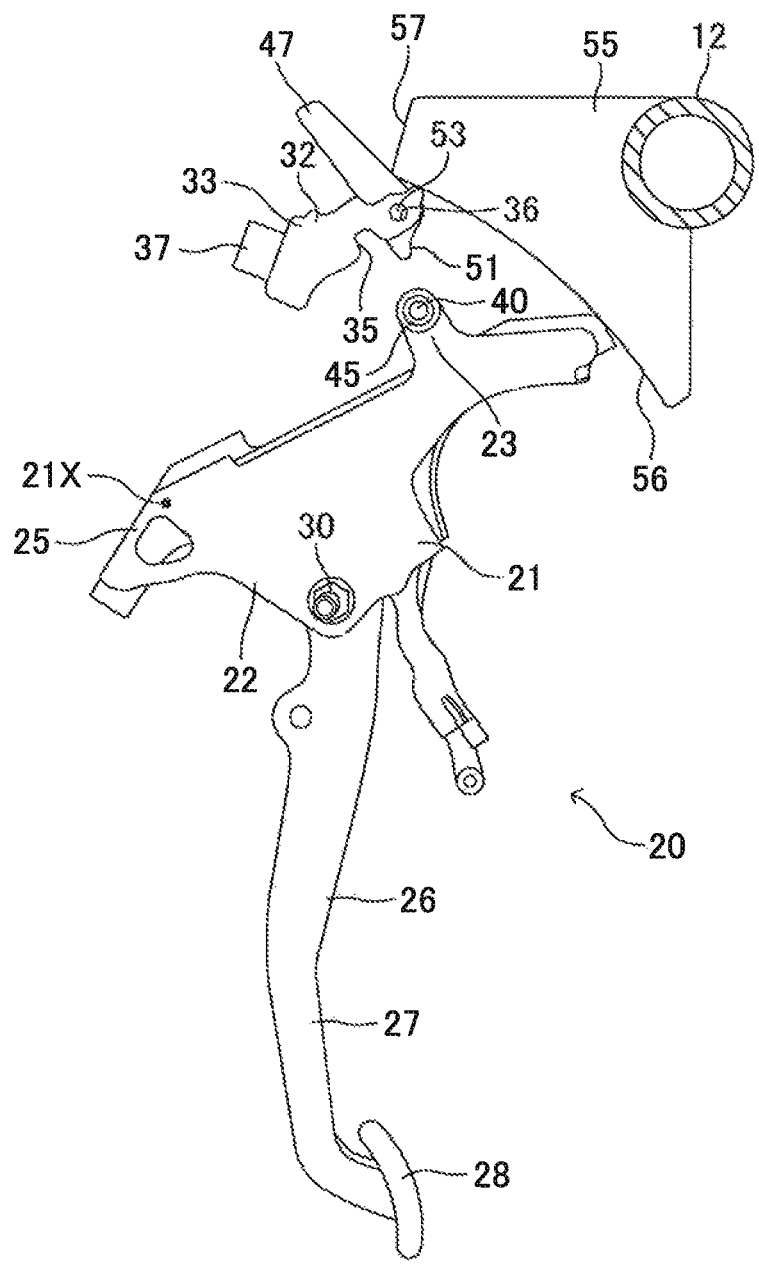
FIG. 4 is a side view of the vehicle pedal device similar to that of FIG. 3 when the dash panel further deforms from the state of FIG. 3.
Figure 7:
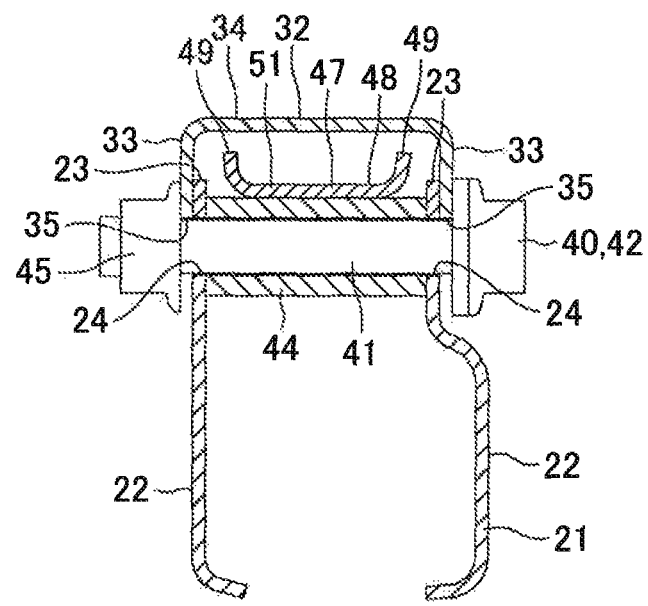
FIG. 7 is a cross sectional view of the vehicle pedal device taken along the line VII-VII of FIG. 3.

The lever bracket 32 has left and right pair of side plates 33. Each of the top ends of central portions in the forward/rearward direction of the left and right side plates 33 is connected to each other by an upper plate 34. Namely, a central portion of the lever bracket 32 has a cross sectional inverted U-shape whose lower surface is opened (shown in FIG. 7). As shown in FIGS. 4 and 7, a bolt receiving groove 35 (first bolt receiving groove) extending upward is formed on each of the lower end surfaces of center portions of the left and right side plates 33, respectively. Each of the upper ends of the bolt receiving grooves 35 has a semi-circular shape. Furthermore, a width (forward/rearward dimension) of each of the bolt receiving grooves 35 gradually increases as approaching from the upper end thereof to the lower end thereof. A space whose upper end is opened is formed between the rear portions of the left and right side plates 33. Furthermore, pin support holes 36 coaxial with each other are formed in the rear portions of the left and right side plates 33, respectively.

The front end portion of the lever bracket 32 is constituted by a fixed portion 37. The fixed portion 37 is fixed to the rear surface of the dash panel 11 using a bolt and a nut (not shown). As shown in FIG. 1, the fixed portion 37 of the lever bracket 32 is positioned above the fixed portion 25 of the pedal bracket 21. When the fixed portion 37 is fixed to the dash panel 11, as shown in FIG. 7, the central portions of the left and right side plates 33 of the lever bracket 32 are brought into contact with the outside surfaces of the left and right holding pieces 23 of the pedal bracket 21, respectively, and the left and right bolt receiving grooves 35 are positioned on an axis of the left and right through holes 24.

As shown in FIGS. 1 through 4 and 7, the bolt 40 (fixing means) extending in the vehicle width direction is inserted into the left and right through holes 24 of the pedal bracket 21 and the left and right bolt receiving grooves 35 of the lever bracket 32. The metal bolt 40 is provided on the outer peripheral surface thereof with a screw portion 41 having a male screw and a head portion 42 fixed to one end of the screw portion 41. The outer diameter of the head portion 42 is greater than that of the screw portion 41 and a width of each of the bolt receiving grooves 35. As shown in FIG. 7, the screw portion 41 passes through a collar 44 in a space between the left and right holding pieces 23. The collar 44 is relatively rotatable with respect to the screw portion 41.

Furthermore, an end of the screw portion 41 which is opposite to the head portion 42 is screwed into the metal nut 45 (fixing means). As shown in FIG. 7, when the nut 45 is screwed with the screw portion 41, the head portion 42 of the bolt 40 is brought into press contact with the outer surface of one of the side plates 33, and the nut 45 is brought into press contact with the outer surface of the other of the side plates 33. Additionally, the inner surface of the one of the side plates 33 is brought into press contact with the outer surface of one of the holding pieces 23, and the inner surface of the other of the side plates 33 is brought into press contact with the outer surface of the other of the holding pieces 23. Namely, the left and right side plates 33 are sandwiched by the bolt 40 and the nut 45. Consequently, friction forces are generated between the head portion 42 and the one of the side plates 33, between the nut 45 and the other of the side plates 33, between the one of the side plates 33 and the one of the holding pieces 23, and between the other of the side plates 33 and the other of the holding pieces 23, respectively. It should be noted that, hereinafter, the total value of these frictional forces is referred to as a "holding force for fixed state between the pedal bracket 21 and the lever bracket 32". The left and right holding pieces 23 and the left and right side plates 33 are fixed to each other by this holding force for fixed state.

Thus, the pedal bracket 21 is fixed to the dash panel 11 by the fixed portion 37 of the lever bracket 32 and the fixed portion 25 of the pedal bracket 21 which is fixed to the lever bracket 32. Therefore, mounting strength of the pedal bracket 21 with respect to the dash panel 11 is a sufficient magnitude.

Therefore, when the driver depresses the pad 28 of the brake pedal 26, the brake pedal 26 rotates stably. In other words, the driver can securely obtain a desired braking force by depressing the pad 28.

The front end portion of the metal rotating lever 47 is disposed between the rear portions of the left and right side plates 33 of the lever bracket 32.

Figure 6:
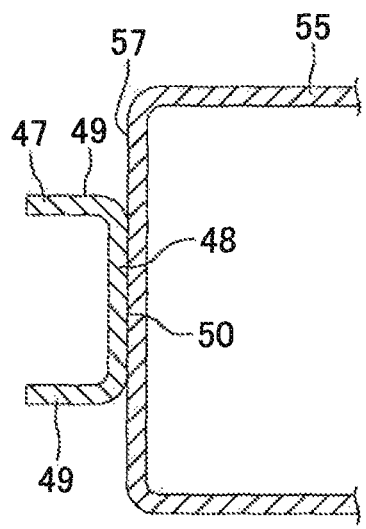
FIG. 6 is a cross sectional view of the vehicle pedal device taken along the line VI-VI of FIG. 3.

As shown in FIGS. 6 and 7, the rotating lever 47 has a cross sectional U-shape whose upper end is opened. Namely, the rotating lever 47 includes a bottom plate 48 and left and right pair of side walls 49 connected to the left and right side edge portions of the bottom plate 48, respectively.

A rear edge of the lower surface of the flat bottom plate 48 is constituted by a linear contacting portion 50 extending linearly in the vehicle width direction. The front end portion of the lower surface of the bottom plate 48 is constituted by a press portion 51 which is a plane. As it is apparent from FIGS. 1 through 4 and 7, the press portion 51 is positioned between the upper plate 34 of the lever bracket 32 and the collar 44.

Through holes coaxial with each other not shown are formed in the left and right side walls 49 of the rotating lever 47, respectively. These through holes are positioned at a more rearward position than the position of the press portion 51 (i.e., these through holes are nearer to the linear contacting portion 50 than the press portion 51). The through holes of the left and right side walls 49 are coaxial with the left and right pin support holes 36 of the lever bracket 32. Additionally, the rotation axis 53 extending in the vehicle width direction is inserted into the left and right pin support holes 36 of the lever bracket 32 and the left and right through holes of the rotating lever 47, and each of left and right end portions of the rotation axis 53 is caulked to the peripheral portion of each of the left and right support holes 36, respectively. Therefore, the rotating lever 47 is rotatable relative to the lever bracket 32 about the rotation axis 53. The axis of this rotation axis 53 is parallel to the linear contacting portion 50 and the press portion 51 of the rotating lever 47.

Furthermore, a spring (not shown) for biasing the rotating lever 47 to rotate the rotating lever 47 with respect to the lever bracket 32 in the clockwise direction in FIGS. 1 through 4 is provided between the lever bracket 32 and the rotating lever 47. When no external force other than the biasing force of the spring is exerted on the rotating lever 47, the front portions of the left and right side walls 49 of the rotating lever 47 are brought into contact with the lower surface of the upper plate 34 of the lever bracket 32, and thereby the rotating lever 47 is positioned in a rotational direction. The position of the rotating lever 47 at this time is an initial position shown in FIGS. 1 and 2. When the rotating lever 47 is positioned at the initial position, the press portion 51 of the rotating lever 47 is positioned away upward from the outer peripheral surface of the collar 44.

The metal retreat prevention bracket 55 (lever rotator) (bracket deforming means) is fixed to the reinforcement for instrument panel 12.

The entire bottom surface of the retreat prevention bracket 55 is constituted by a pedal bracket guiding surface 56. The pedal bracket guiding surface 56 is a curved surface which extends gradually downward from the front portion thereof to the rear portion thereof. Furthermore, the front end surface of the retreat prevention bracket 55 is constituted by a contacting plane surface 57 which is a plane. The contacting plane surface 57 is parallel to the axis of the rotation axis 53.

A position in the vehicle width direction of the retreat prevention bracket 55 is the same as those of the pedal bracket 21, the brake pedal 26, the lever bracket 32, and the rotating lever 47.

As shown in FIG. 1, when the dash panel 11 maintains the initial shape thereof and the rotating lever 47 is positioned at the initial position thereof, the pedal bracket 21 and the rotating lever 47 are positioned away forward from the retreat prevention bracket 55. At this time, the rear end portion of the rotating lever 47 and the contacting plane surface 57 of the retreat prevention bracket 55 face with each other in the forward/rearward direction, and the rear end portion of the pedal bracket 21 faces with the pedal bracket guiding surface 56 of the retreat prevention bracket 55 in the forward/rearward direction.

Subsequently, a motion of the brake pedal device 20 when the vehicle 10 collides with another vehicle located in front of the vehicle 10 will be described.

When an impact is generated in the vehicle at the time of a collision and thereby a large rearward force is applied to the entire vehicle 10 a magnitude of a rearward force exerted on the dash panel 11 tends to be larger than that of a rearward force exerted on both the reinforcement for instrument panel 12 and the retreat prevention bracket 55. Therefore the dash panel 11 deforms rearward with a larger amount than the retreat prevention bracket 55 (this deformation includes elastic deformation and plastic deformation. Following "deform(s)" and "deformation" mean the same thing.). Therefore, the dash panel 11 moves rearward relative to the retreat prevention bracket 55 together with the pedal bracket 21 and the lever bracket 32. Namely, the dash panel 11 moves close to the retreat prevention bracket 55 together with the pedal bracket 21, the brake pedal 26, the lever bracket 32, and the rotating lever 47 from the front.

Figure 3:
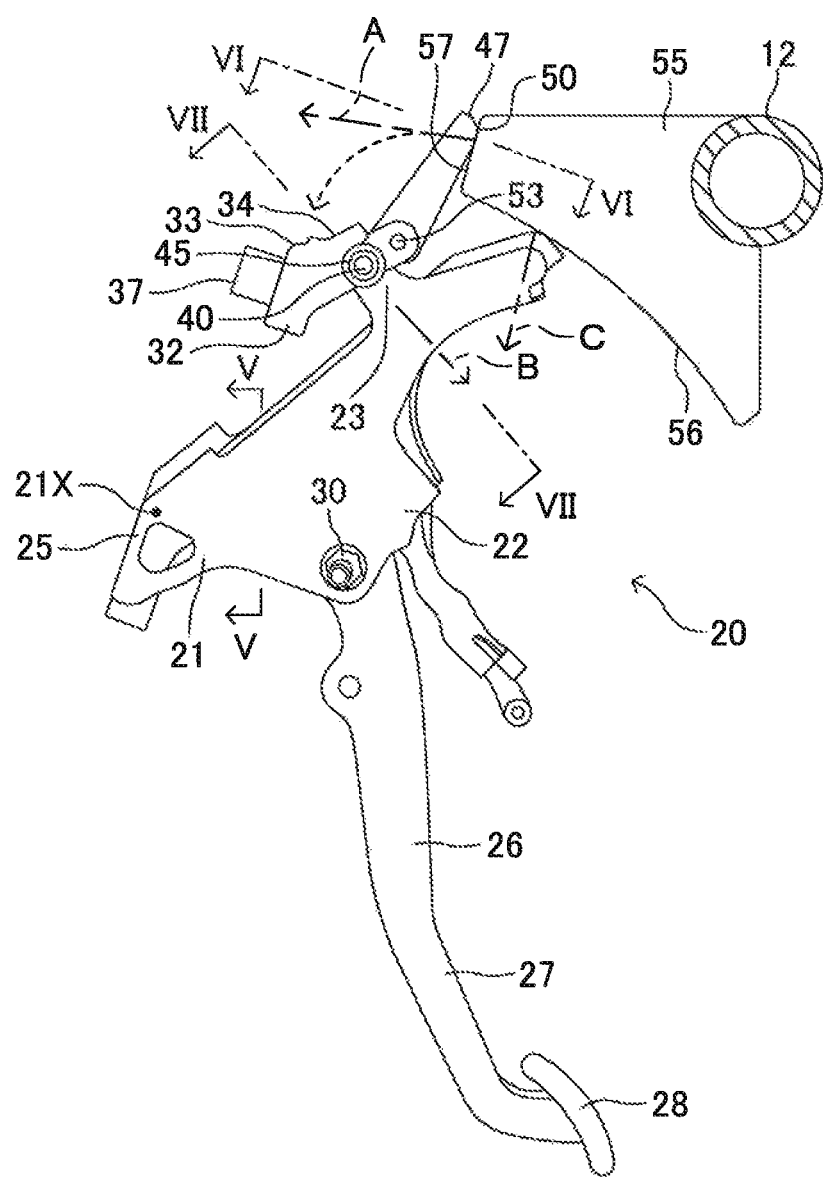
FIG. 3 is a side view of the vehicle pedal device with the dash panel, the instrument panel, the brake booster, the pushrod, and the nut omitted when the dash panel deforms rearward due to a collision of a vehicle.

Then, the linear contacting portion 50 of the rotating lever 47 collides with the contacting plane surface 57 of the retreat prevention bracket 55 from the front (shown in FIGS. 3 and 6).

Since the linear contacting portion 50 and the contacting plane surface 57 are parallel to the axis of the rotation axis 53, at this time the rotating lever 47 receives a forward reaction force in other words a reaction force A (shown in FIG. 3) that hardly includes lateral direction components, from the retreat prevention bracket 55. Furthermore, the rotating lever 47 rotates vigorously in the counterclockwise in FIGS. 1 through 4 against the biasing force of the spring by the forward reaction force A applied from the retreat prevention bracket 55, since the retreat prevention bracket 55 is fixed to the reinforcement for instrument panel 12 while the rotating lever 47 is rotatably supported by the lever bracket 32. Then, the front portions of the left and right side walls 49 which were in contact with the lower surface of the upper plate 34 of the lever bracket 32 so far move away downwardly from the lower surface of the upper plate 34. As a result, the press portion 51 of the rotating lever 47 that was positioned away upward from the outer peripheral surface of the collar 44 collides with the upper portion of the outer peripheral surface of the collar 44 from above (shown in FIG. 7). Therefore, a force in the direction of the arrow B shown in FIG. 3 is applied to the collar 44 from the press portion 51, and this force is transmitted to the screw portion 41 of the bolt 40 from the collar 44. The force in the direction of the arrow B includes downward components.

At this time, if a magnitude of the force in the direction of the arrow B, which is applied from the press portion 51 of the rotating lever 47 to the screw portion 41 of the bolt 40 via the collar 44, exceeds the holding forte for fixed state between the pedal bracket 21 and the lever bracket 32, the head portion 42 and the nut 45 slide downward relative to the left and right side plates 33, and the screw portion 41 of the bolt 40 moves downward relative to the bolt receiving grooves 35. Then, when the head portion 42 and the nut 45 are separated downward from the left and right side plates 33, the holding force for fixed state between the pedal bracket 21 and the lever bracket 32 is disappeared.

Additionally, after the rotating lever 47 collides with the retreat prevention bracket 55, the rear end portion of the pedal bracket 21 collides with the pedal bracket guiding surface 56 of the retreat prevention bracket 55. Then, as shown by the arrow C in FIG. 3, the pedal bracket 21 receives a downward reaction force from the pedal bracket guiding surface 56. Therefore, the pedal bracket 21 deforms downward. More specifically, the pedal bracket 21 deforms while rotating in the clockwise direction in FIGS. 1 through 3 about the deformation center 21X which is located in the vicinity of the fixed portion 25 and is located in front of the support pin 30. Accordingly, the screw portion 41 of the bolt 40 which is integral with the pedal bracket 21 moves downward while receiving a force in the direction of the arrow D shown in FIG. 2. The direction of the arrow D is a direction of a rotation trajectory of the screw portion 41 when the screw portion 41 rotates downward about the deformation center 21X. Therefore, the screw portion 41 further moves downward relative to the bolt receiving grooves 35.

The downward moving direction of the screw portion 41 of the bolt 40 at this time is a direction of a resultant force composed of the force in the direction of the arrow B and the force in the direction of the arrow D. The force in the direction of the arrow B is a force which the screw portion 41 receives from the press portion 51. The force in the direction of the arrow D is a force which is generated in the pedal bracket 21 due to the deformation of the pedal bracket 21.

Figure 2:
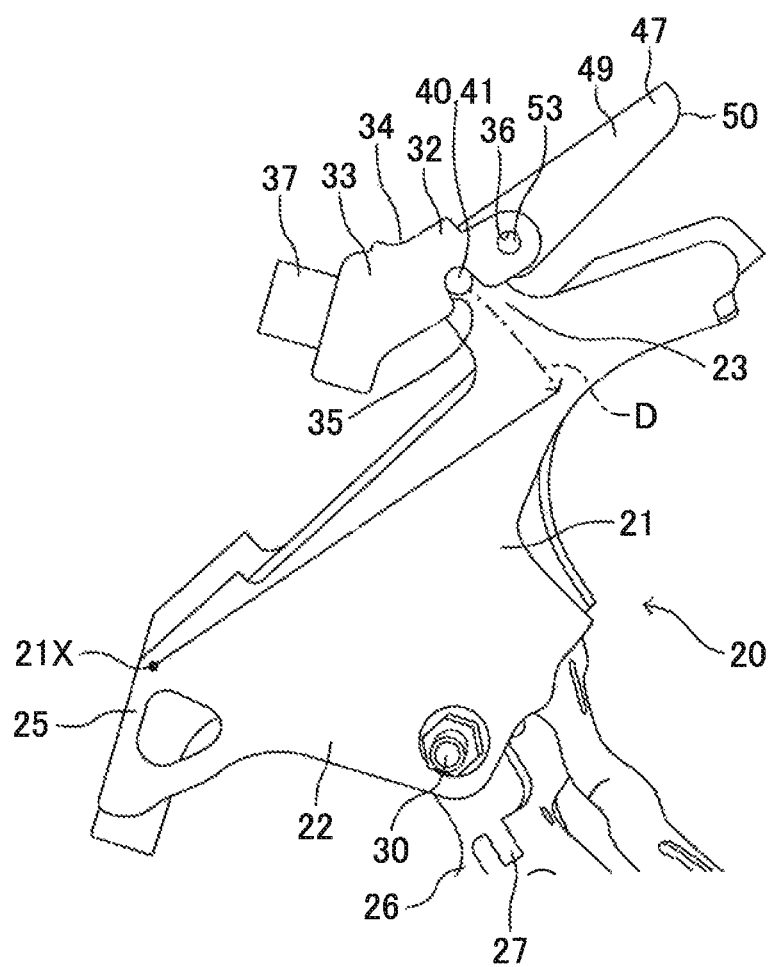
FIG. 2 is a side view of main portion of the vehicle pedal device with a dash panel, an instrument panel a brake booster, a pushrod, and a nut omitted.

As is apparent from FIGS. 2 and 3, the bolt receiving grooves 35 are opened (formed) in a direction that includes both the direction of the arrow B and the direction of the arrow D when viewing the brake pedal device 20 from the side. Therefore, the screw portion 41 can smoothly escape from the bolt receiving grooves 35 (shown in FIG. 4).

When the bolt 40 escapes from the bolt receiving grooves 35, the downward deformation of the pedal bracket 21 is facilitated. Therefore, as shown in FIG. 4, the rear end portion of the pedal bracket 21 is guided to move downward by the pedal bracket guiding surface 56, and thereby the pedal bracket 21 further deforms downward from the deformation state thereof shown in FIG. 3. As a result, the brake pedal 26 supported by the pedal bracket 21 via the support pin 30 located behind the deformable center 21X is rotated forward relative to the dash panel 11. Therefore, it is possible to suppress a rearward movement of the brake pedal 26, in other words a movement of the brake pedal 26 toward the driver, owing to the impact generated in the vehicle 10.

Furthermore, the brake pedal device 20 has the following advantage, because both of the pedal bracket 21 and the lever bracket 32 are fixed to the dash panel 11.

Namely, directions of component forces of the force generated in the vehicle 10 due to an actual collision are diverse. The force can contain a lot of lateral component forces. For example, if this force contains a lot of lateral component forces, the dash panel 11 is deformed not only rearward but also in the lateral direction. However, even when the dash panel 11 is deformed in any direction, the pedal bracket 21 and the lever bracket 32 (and the rotating lever 47), which are supported by the dash panel 11, move substantially in the same direction. In other words, the moving direction of the pedal bracket 21 and the moving directions of the lever bracket 32 and the rotating lever 47 are not largely different from each other when the dash pane 11 is deformed. Therefore, there is a very small possibility that when the dash panel 11 is deformed due to the collision, the inner surfaces of the bolt receiving grooves 35 are pried by the bolt 40 pressed by the rotating lever 47 (i.e., the bolt 40 is brought into press contact with the inner surfaces of the bolt receiving grooves 35 while being inclined to the lateral direction in a plane view), and thereby the bolt 40 cannot escape downward from the bolt receiving grooves 35. Therefore, even when the dash panel 11 is deformed in any direction, it is possible to separate the pedal bracket 21 from the lever bracket 32. In other words, regardless of the deformation direction of the dash panel 11, it is possible to move the brake pedal 26 forward relative to the dash panel 11.

Additionally, in the brake pedal device 20, "the holding force for fixed state between the pedal bracket 21 and the lever bracket 32" is determined using the bolt 40 and the nuts 45. Therefore it is possible to adjust a magnitude of the holding force for fixed state easily by adjusting a tightening force between the bolt 40 and the nut 45.

Accordingly, it is possible to change the magnitude of "the holding force for fixed state" easily according to vehicle kind, etc.

Additionally, in the brake pedal device 20, the pedal bracket 21 and the lever bracket 32 are not fixed to the retreat prevention bracket 55. Therefore, when installing the brake pedal device 20 onto the vehicle 10, it is possible to integrate (assemble) the reinforcement for instrument panel 12, the instrument panel 13, and the retreat prevention bracket 55 beforehand and thereafter install the integrated assembly onto the body shell. Furthermore, since the pedal bracket 21 fixed to the dash panel 11 and the retreat prevention bracket 55 fixed to the reinforcement for instrument panel 12 are not fixed to each other, a precision of relative mounting position between the pedal bracket 21 and the retreat prevention bracket 55 does not need to be very high.

Therefore, the brake pedal device 20 of the present embodiment can be easily install onto the vehicle 10.

The retreat prevention bracket 55 does not support the pedal bracket 21. Therefore, a mechanical strength, which is necessary to firmly support the pedal bracket 21, is not required for the retreat prevention bracket 55. Therefore, it is possible to reduce a weight of the retreat prevention bracket 55 compared with the structure in which the retreat prevention bracket 55 supports the pedal bracket 21.

Note that the present invention is not limited to the above embodiments, and it is possible to adopt various modifications within the scope of this invention.

Figure 8:
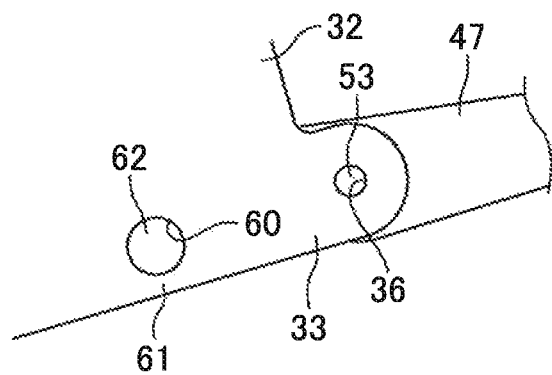
FIG. 8 is a side view of main portions of lever bracket and the rotating lever according to a modified embodiment of the present invention.

In the modified embodiment shown in FIG. 8, the bolt receiving grooves 35 of the lever bracket the 32 are replaced by bolt holding holes 60 having the same diameter as the through holes 24, and a narrow broken portion 61 is formed between each of the lower ends of the bolt holding holes 60 and each of the lower edges of the side plates 33, respectively. Furthermore, in this modified embodiment, the bolt 40 and the nut 45 are omitted, and instead of omitting these members, a metal pressing pin 62 (fixing means) having the substantially same diameter as the through holes 24 and the bolt holding holes 60 and extending in the vehicle width direction is inserted into the left and right through holes 24 of the pedal bracket 21 and the left and right bolt holding holes 60 of the lever bracket 32. The collar 44 located between the left and right holding pieces 23 is disposed around the outer peripheral portion of the pressing pin 62.

Therefore, when the press portion 51 of the rotating lever 47 presses the collar 44 downward due to a collision of the vehicle 10, the pressing pin 62 which is pressed downward by the collar 44 presses the broken portions 61 downward with a strong force. Then, when a stress of the broken portions 61 exceeds the breaking stress thereof (the holding force for fixed state) owing to a force applied from the pressing pin 62 to the broken portions 61 the broken portions 61 is broken. Therefore, relative downward moving of the pressing pin 62 and the pedal bracket 21 with respect to the lever bracket 32 becomes possible, and thereby it becomes possible to rotate the brake pedal 26 forward relative to the dash panel 11.

In the above embodiment and the modified embodiment in FIG. 8, the brake pedal device 20 may be configured so that the press portion 51 of the rotating lever 47 presses, instead of the collar 44, a portion (for example, the left and right holding pieces 23) of the pedal bracket 21 with a force exceeding the holding force for fixed state when a collision of the vehicle 10 occurs. Also in this case, it becomes possible to rotate the brake pedal 26 forward relative to the dash panel 11.

The bolt 40, the nut 45, and the pressing pin 62 may be omitted and instead of omitting these members, the pedal bracket 21 and the lever bracket 32 may be welded to each other. In this case, this welding corresponds to "fixing means" which fixes the pedal bracket 21 and the lever bracket 32 to each other with the holding force for fixed state.

In this modified embodiment, the brake pedal device 20 is configured so that the press portion 51 of the rotating lever 47 presses a portion (for example, the left and right holding pieces 23) of the pedal bracket 21 downward with a force exceeding the holding force for fixed state when a collision of the vehicle 10 occurs.

The bolt 40 passing through the lever bracket 32 in the vehicle width direction, the nut 45, and the collar 44 may be mounted onto the lever bracket 32, and bolt receiving grooves (second bolt receiving grooves) which correspond to the bolt receiving grooves 35 may be formed in the pedal bracket 21. Each of these bolt receiving grooves has an open upper end, respectively. The bolt 40 mounted onto the lever bracket 32 can insert into these bolt receiving grooves from above.

In this case, the left and right holding pieces 23 of the pedal bracket 21 are positioned outside of the left and right side plates 33 of the lever bracket 32 respectively, and the left and right holding pieces 23 are sandwiched by the head portion 42 of the bolt 40 and the nut 45. Further, in this case, the brake pedal device 20 is configured so that the press portion 51 of the rotating lever 47 presses a portion of the pedal bracket 21 downward with a force exceeding the holding force for fixed state. In this case, for example, the press portion 51 of the rotating lever 47 is disposed directly above the left and right holding pieces 23. The press portion 51 presses the left and right holding pieces 23 downward when a collision of the vehicle 10 occurs.

Also in this case, it becomes possible to rotate the brake pedal 26 forward relative to the dash panel 11.

The collar 44 may be omitted from the brake pedal device 20 of the above embodiment and modified embodiment.

The contacting plane surface 57 of the retreat prevention bracket 55 may be changed to a curved surface.

The dash panel 11, the reinforcement for instrument panel 12, the pedal bracket 21, the lever bracket 32, the bolt 40 the nut 45, the rotating lever 47, the retreat prevention bracket 55, and the pressing pin 62 may be constituted by a material having high rigidity other than metal.

A lever rotator having a portion (portion corresponding to the contacting plane surface 57) which is for rotating the rotating lever 47 when a collision of the vehicle 10 occurs may be configured to be an independent member from a bracket deforming means having a portion (portion corresponding to the pedal bracket guiding surface 56) which is for deforming the pedal bracket 21 downwardly when the collision occurs, and further, the lever rotator and the bracket deforming means may be fixed to the reinforcement for instrument panel 12.

The present invention may be applied to a vehicle pedal device having an accelerator pedal.

Similarly, it is also possible to apply the present invention to a vehicle pedal device having a clutch pedal.

What is claimed is:

1. A vehicle pedal device comprising:
a pedal bracket fixed to a rear surface of a dash panel which constitutes a portion of a body shell of a vehicle;
a pedal which is supported by said pedal bracket configured to rotate about an axis extending in a vehicle width direction at a rearward position with respect to a fixed portion of said pedal bracket to said dash panel;
a lever bracket fixed to said dash panel, said lever bracket being a member independent of said pedal bracket;
fixing means for fixing said pedal bracket and said lever bracket to each other with a predetermined holding force for fixed state, and for releasing a fixed state between said pedal bracket and said lever bracket when said pedal bracket receives a force, exceeding said holding force for fixed state, in a direction to cause said pedal bracket to move downward relative to said lever bracket;
a rotating lever which is supported by said lever bracket configured to rotate about a rotation axis extending in said vehicle width direction;
a reinforcement for instrument panel which is fixed to said body shell and supports an instrument panel;
a lever rotator which is fixed to said reinforcement for instrument panel, said lever rotator contacting with said rotating lever from behind to rotate said rotating lever when said lever bracket moves rearward together with said dash panel; and
bracket deforming means, fixed to said reinforcement for instrument panel, for contacting with said pedal bracket from behind to deform said pedal bracket downward when said pedal bracket moves rearward together with said dash panel;
wherein,
said rotating lever includes a press portion configured to press said fixing means or said pedal bracket downward with a force exceeding said holding force for fixed state when said rotating lever is rotated by said lever rotator.

2. A vehicle pedal device according to claim 1, wherein,
said rotating lever includes a linear contacting portion having a linear shape parallel to said rotation axis, said linear contacting portion contacting with said lever rotator when said lever bracket moves rearward; and
said lever rotator includes a contacting plane surface which provides a plane parallel to said rotation axis to contact with said linear contacting portion when said lever bracket moves rearward.

3. A vehicle pedal device according to claim 1, wherein, said fixing means comprises:
a bolt penetrating one of said pedal bracket and said lever bracket in said vehicle width direction, said bolt having at one end thereof a head portion contacting with one of two lateral surfaces of the other of said pedal bracket and said lever bracket; and
a nut which is screwed with said bolt, wherein said nut and said head portion sandwich the other of said pedal bracket and said lever bracket with said holding force for fixed state by contacting with the other of said two lateral surfaces of the other of said pedal bracket and said lever bracket.

4. A vehicle pedal device according to claim 3, wherein,
a first bolt receiving groove is formed in said lever bracket, said bolt being insertable into said first bolt receiving groove from below, said first bolt receiving groove having an open lower end; or
a second bolt receiving groove is formed in said pedal bracket, said bolt being insertable into said second bolt receiving groove from above, said second bolt receiving groove having an open upper end.

5. A vehicle pedal device according to claim 2, wherein, said fixing means comprises:
a bolt penetrating one of said pedal bracket and said lever bracket in said vehicle width direction, said bolt having at one end thereof a head portion contacting with one of two lateral surfaces of the other of said pedal bracket and said lever bracket; and
a nut which is screwed with said bolt, wherein said nut and said head portion sandwich the other of said pedal bracket and said lever bracket with said holding force for fixed state by contacting with the other of said two lateral surfaces of the other of said pedal bracket and said lever bracket.

6. A vehicle pedal device according to claim 5, wherein,
a first bolt receiving groove is formed in said lever bracket, said bolt being insertable into said first bolt receiving groove from below, said first bolt receiving groove having an open lower end; or
a second bolt receiving groove is formed in said pedal bracket, said bolt being insertable into said second bolt receiving groove from above, said second bolt receiving groove having an open upper end.

* * * * *